No. 884,746. PATENTED APR. 14, 1908.
H. W. MACKENZIE.
MEANS FOR MOLDING BISCUITS.
APPLICATION FILED DEC. 29, 1906.
2 SHEETS—SHEET 1.
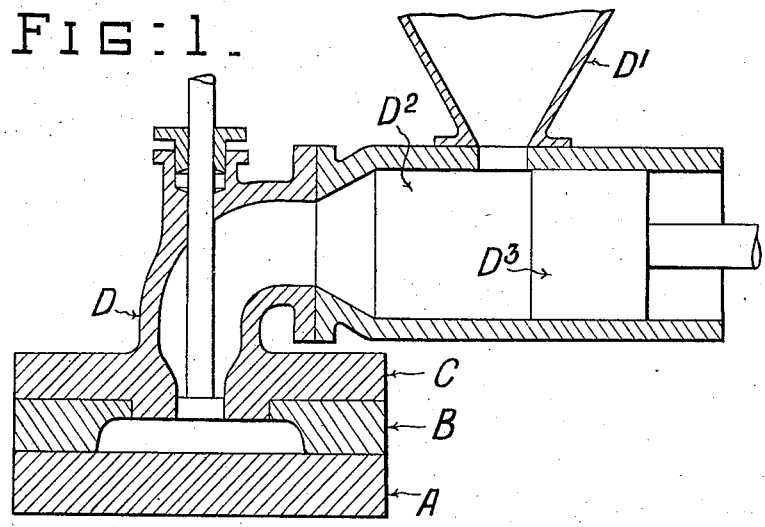
FIG:1.
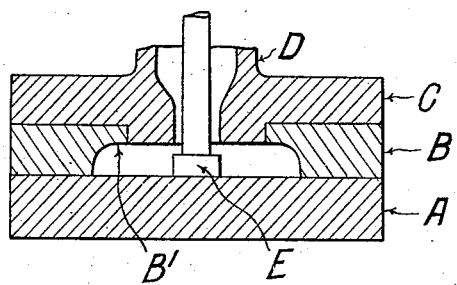
FIG:2.
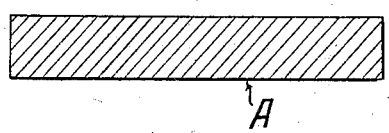
FIG:3.

No. 884,746. PATENTED APR. 14, 1908.
H. W. MACKENZIE.
MEANS FOR MOLDING BISCUITS.
APPLICATION FILED DEC. 29, 1906.
2 SHEETS—SHEET 2.
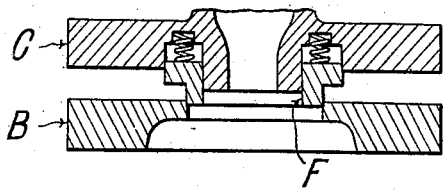
FIG:4.
FIG:5.  FIG:7.
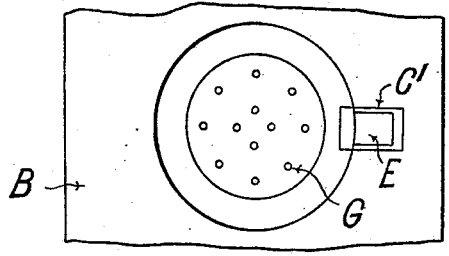
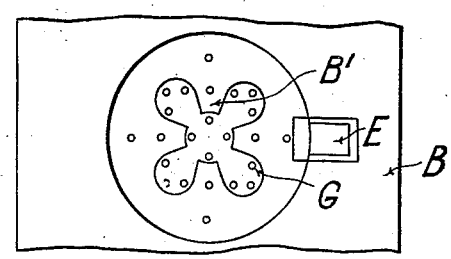
FIG:6.  FIG:8.
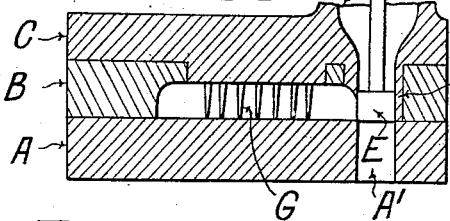
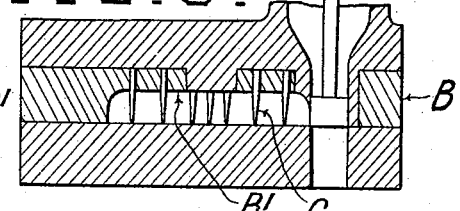
FIG:9.  FIG:10.
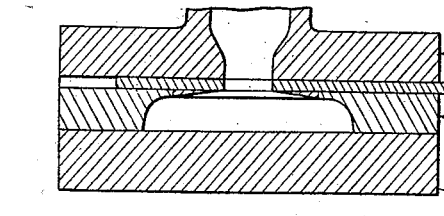
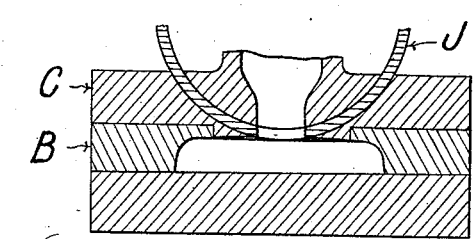
FIG:11.
Witnesses
Chas. H. Smith
Inventor
Hugh Watson Mackenzie
per Harold Serrell
his atty.

UNITED STATES PATENT OFFICE.

HUGH WATSON MACKENZIE, OF EDINBURGH, SCOTLAND.

MEANS FOR MOLDING BISCUITS.

No. 884,746.  Specification of Letters Patent.  Patented April 14, 1908.

Application filed December 29, 1906. Serial No. 349,938.

*To all whom it may concern:*

Be it known that I, HUGH WATSON MACKENZIE, a subject of the King of Great Britain and Ireland, of 22 Upper Grove Place, Edinburgh, in the county of Edinburgh, Scotland, have invented certain new and useful Improvements in Means for Molding Biscuits, (for which I have made application for a patent in Great Britain, No. 1,891, bearing date January 25, 1906,) of which the following is a specification.

In manufacturing drop biscuits it is common to produce the biscuit form at a single operation by extruding a definite quantity of dough through a die; and in manufacturing molded biscuits it has been proposed to extrude dough into a receiver and to then impress it to produce the biscuit form, after which it is ejected for baking; further, in dealing with some plastic materials, it has been proposed to employ a mold formed in two sections, provided with an inlet passage to permit the material to be introduced into the mold under pressure when the two sections are assembled, producing a closed mold, but in these cases a runner or projection has been produced upon the molded form by reason of the inlet passage constituting an extension of the molding area. Sectional molds of this character may for convenience of reference, be designated closed molds.

This invention relates to the manufacture of molded biscuits and the like, hereinafter referred to as biscuits, and the object in view is to produce an improved closed mold of sectional construction formed with a supply aperture fitted with a controlling valve, adapted, when opened to permit dough to be extruded into the mold and when closed, to close the supply and cut off the supply passage so that it forms no part of the molding area; and further to produce an improved construction of sectional mold with the object of facilitating the subsequent ejection of the molded form.

According to this invention a mold of compound formation is employed having a supply aperture fitted with a controlling valve, which, when opened, while the composing elements are assembled forming a closed mold, permits dough to be extruded into and take the form of the mold, after which the valve is closed, the sections of the mold separated, and the biscuit form ejected.

In the accompanying drawings some examples of the construction of molds according to this invention are indicated.

In the drawings Figures 1 and 2, are part sectional side elevations illustrating the elements of a mold assembled. Fig. 3, is a similar illustration of the elements separated. Fig. 4, shows a detail. Figs. 5 and 7 are inverted plan views, and Figs. 6 and 8 are respectively corresponding part sectional side elevations of modified forms of constructions. Figs. 9 and 11 are part sectional side elevations of further modifications, and Fig. 10, is a cross sectional view of Fig. 9.

The form of mold illustrated in the drawings consists of three elements, namely, a base plate, A, an open frame, B, and a cover, C. In arrangement, the frame, B, is adapted to lie upon the base plate, A, and the cover, C, to rest upon the frame, B, the three, when assembled, forming a closed mold. The cover, C, constitutes the terminal end of a dough feeder, D, which, as illustrated at Fig. 1, consists of a dough supply hopper, $D^1$, from which dough may be fed into a chamber, $D^2$, and be periodically forced forward by a reciprocating piston, $D^3$.

Referring to Figs. 1, 2, and 3, of the drawings, a construction of mold is illustrated suitable for producing ring biscuits, in which a piston valve, E, is fitted to control the terminal end of the dough feeder, D. The frame, B, is preferably formed with eaves, $B^1$, projecting inwards from its top edge, so as to strip the molded biscuit form off the cover, C, as the cover and frame separate, as will be understood from the following description. In some cases, this action may be assisted by adopting means, such as are illustrated at Fig. 4, in which a spring actuated ejector ring, F, is fitted, within the sphere of action of the eaves, $B^1$, which is pressed inwards in the operation of closing the mold. In action, with the parts assembled as shown at Fig. 1, upon opening the terminal end of the dough feeder, D, by lowering the valve, E, so that it rests upon the base plate, A, in which position it forms a central core to the mold, as shown at Fig. 2, the piston, $D^3$, is advanced, by any suitable mechanism, so that dough under pressure is forced into and fills the mold, after which the valve is closed and the piston, $D^3$, retracted. The base plate, A, and frame, B, may now be lowered together, while the cover remains stationary; or the cover, C, may be raised while the base plate and frame remain stationary. The charged frame may then be slid over or raised from the base plate into a position for the ejection of the molded form, while permitting another frame to be brought into the charging position. The illustration Fig. 3, represents the frame in position for the ejection of the molded biscuit form, which may be effected by an ejector operating through the open top of the frame. The system for separating the elements after the mold has been charged may be varied. For example, the base plate may first be subjected to a preliminary separation and replacement, or subjected to a preliminary side movement, to be followed by the actions in the order as above described. In some cases it may be found desirable to heat the base plate, A, or impart a continuous sliding movement to it during the process of charging.

In the example of construction shown at Figs. 5 and 6, the terminal end of the dough feeder, D, is controlled by a valve, E, mounted in a guide, C¹, depending from the cover, C. A corresponding recess is formed in the frame, B, to receive the guide, C¹, and a way, A¹, is cut in the base plate to permit the valve to descend. With the elements of the mold and valve in the positions shown, the contour of the frame where recessed is completed by the inner faces of the guide, C¹, in conjunction with the face of the valve, E. The action in this case is similar to that above described, in that when the valve descends the dough is free to pass into the mould. The molds can be fitted with pins, G, which may be secured in the cover, C, for producing perforated biscuit forms. For convenience of illustration, pins, G, have been shown in Figs. 5, and 6; and a further example is illustrated at Figs. 7 and 8, in which case the eaves, B¹, are formed with inwardly projecting tongues and some of the pins, G, are arranged to pass through holes formed therein.

In lieu of vertically operating valves, horizontally sliding valves such as, H, as indicated at Figs. 9 and 10, or an oscillatory valve, such as, J, as indicated at Fig. 11, may be fitted in the cover, C. In these constructions it will be noted that the closure faces of the valves are arranged to effect a clean cut off on the surface of the biscuit form.

It will be understood that the interior surfaces of the cover and base plate may be engraved, and the valve and frame may be of varying shapes to produce ornamental biscuits of different designs.

What I do claim as my invention, and desire to secure by Letters Patent, is:—

1. A mold of compound formation, having a supply aperture fitted with a controlling valve adapted when closed to complete the contour of the molding area while cutting off the supply passage from the mold, substantially as described.

2. A mold of compound formation, consisting of a base plate, an open frame, and a cover, and having a supply aperture fitted with a controlling valve arranged perpendicularly to the cover and set at the side thereof, substantially as and for the purposes set forth.

3. A mold of compound formation, consisting of a base plate, an open frame, and a cover provided with pins, and having a supply aperture fitted with a controlling valve, substantially as and for the purposes set forth.

In testimony whereof I have signed my name to this specification in the presence of two subscribing witnesses.

HUGH WATSON MACKENZIE.

Witnesses:
ARCHD. J. TORRANCE,
A. HARROWED.